United States Patent [19]
Nix

[11] 3,733,707
[45] May 22, 1973

[54] METHOD AND APPARATUS FOR CUTTING OPENINGS IN PANELING OR THE LIKE

[76] Inventor: William R. Nix, 200 South Tekoppel Avenue, Evansville, Ind. 47712

[22] Filed: Jan. 29, 1970

[21] Appl. No.: 6,906

[52] U.S. Cl..............33/180 R, 33/197, 33/DIG. 10, 144/144
[51] Int. Cl. ............................................G01b 5/14
[58] Field of Search ....................33/DIG. 10, 197, 33/180 A; 144/144

[56] References Cited
UNITED STATES PATENTS

| | | |
|---|---|---|
| 2,775,812 | 1/1957 | Mohr.................................33/197 X |
| 2,788,151 | 4/1957 | Shore................................33/197 X |
| 3,116,563 | 1/1964 | Gelbman..........................33/DIG. 10 |
| 2,832,154 | 4/1958 | Bauer...................................33/197 |

Primary Examiner—William D. Martin, Jr.
Attorney—Warren D. Flackbert

[57] ABSTRACT

A method and structure for simplifying the cutting of an opening in paneling, wallboard or the like, as for access to an electrical outlet box, characterized by the use of a jig having a centering pin, where the jig is removably secured to the electrical outlet box, a guide plate having an opening which receives such centering pin, and a template surrounding the guide plate. After removing the guide plate, and with the use of a conventional router in combination with the template, an accurate opening for the electrical outlet box is readily achieved.

8 Claims, 6 Drawing Figures

PATENTED MAY 22 1973

INVENTOR
WILLIAM R. NIX

BY Warren D. Hackbart
ATTORNEY

INVENTOR
WILLIAM R. NIX
BY Warren D. Hackbert
ATTORNEY

METHOD AND APPARATUS FOR CUTTING OPENINGS IN PANELING OR THE LIKE

As is known, the locating of openings providing access to electrical outlet boxes or the like during the installation of paneling or wallboard has proven to be a problem for the builder, presenting high labor cost because of the time required for such operation. In this connection, and typically, careful measuring was a necessity, from either the floor line, the ceiling line, or any other desired point of reference, to positively define the opening for the outlet box. Even after the opening was made, electricians oftentimes complained about the resulting configuration, in that the outline thereof burdened the electrical installation procedure, sometimes requiring a modification by the electrician.

The present invention provides a simplified method and apparatus for cutting openings in paneling or wallboard to reveal electrical outlets, telephone outlets, control panels or the like. In this connection, only three basic components are involved, i.e., a jig with a removable centering pin, a template defined by a base member having a rim or frame around its edge and releasably secured to the paneling, and a guide plate received within the frame of the template, and having an opening for receiving the centering pin, such guide plate being removed after centering has been accomplished.

With the guide plate removed, a conventional router is used, following a defined configuration on the inner edge of the template frame. The geometry of the frame of the template is quite important in the practice in the invention, where outwardly curved portions thereof make, by virtue of the diameter of the router, an access opening having one or more peaks.

The invention is highly adaptable for use in making an opening for either a single or a double electrical outlet box. In the instance of a single electrical outlet box, the jig is typically an elongated member, threadedly receiving the aforesaid centering pin, having a projection which extends from one end thereof, the latter being received in, preferably, an upper threaded opening in the electrical outlet box, where the opposite end of such member is slotted for ready positioning by screw means in a lower threaded opening. In the instance of a double electrical outlet box, the elongated member is longer than that employed with a single electrical outlet box, extending, respectively, from the upper left or right threaded opening to the lower right or left threaded opening on such box. In either event, the centering pin automatically defines the proper position for subsequent routing action. The only manual cutting requirement prior to use of the router is the location of a rough sized opening in the paneling through which the centering pin can extend.

The invention represents a considerable saving in time and, therefore, money to the building contractor, in readily and positively establishing and positioning an access opening in paneling or wallboard for an electrical outlet box or the like.

A better understanding of the present invention will become more apparent from the following description, taken in conjunction with the accompanying drawings, wherein FIG. 1 is a view in side elevation, partly fragmentary and mostly in vertical section, showing the assembled invention prior to removal of the guide plate;

Figure 1:
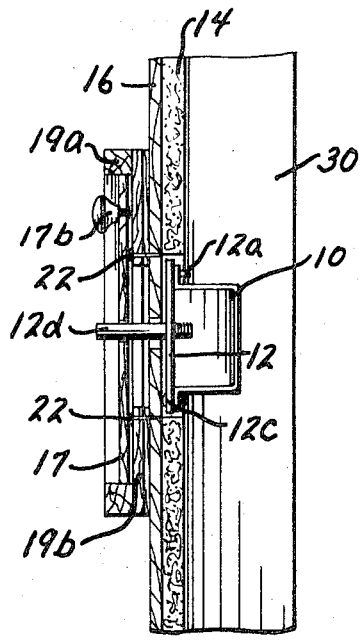
Figure 2:
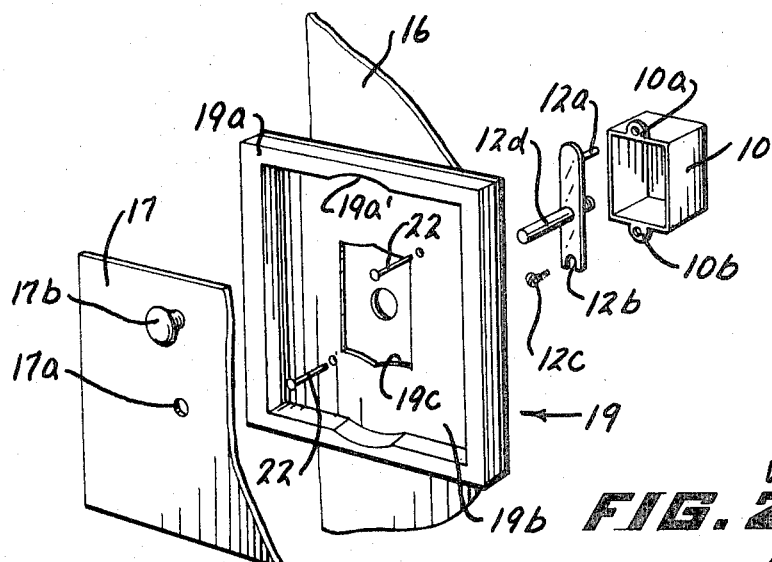
FIG. 2 is a perspective view, exploded for clarity of presentation, showing the components forming the invention in a typical installation.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated herein being contemplated as would normally occur to one skilled in the art to which the invention relates.

Figure 4:
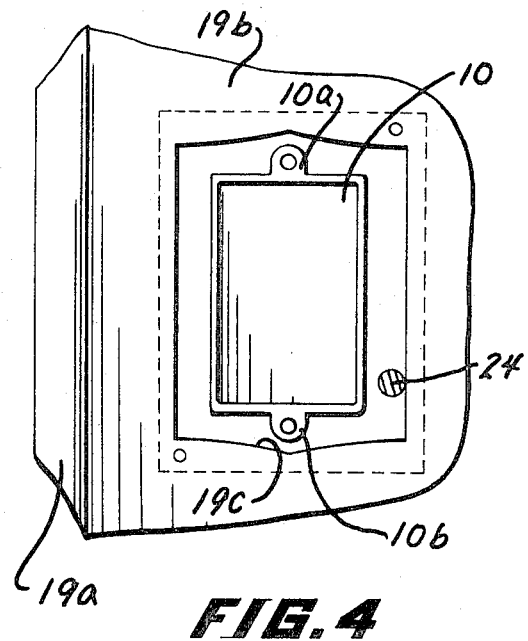
FIG. 4 is a view in front elevation showing the electrical outlet box after routing has been accomplished.
Figure 6:
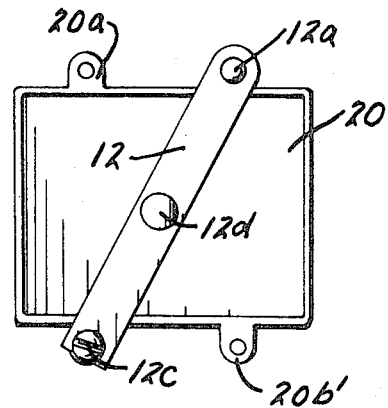

Referring now to the figures, the invention is shown in connection with a typical electrical outlet box, either a single outlet box 10 (FIG. 4) or a double outlet box 20 (FIG. 6). As is customary, either of the aforesaid electrical outlet boxes are secured to a stud 30 forming part of a conventional wall structure for a house or building (see FIG. 1).

With particular reference to FIGS. 1 and 6, a jig 12 employed by the invention typically comprises an elongated bar having a pin 12a projecting from its upper end and a slot 12b in its lower end. The pin 12a is adapted to be received in one of the threaded openings customarily found in flanges disposed on an electrical outlet box for positioning the female sockets (not shown) therein. In the instance of the single electrical outlet box 10, an upper flange 10a and a lower flange 10b is provided, while in the instance of a double electrical outlet box 20, there are two upper flanges 20a and 20a' and two lower flanges 20b and 20b' (flanges 20a' and 20b are not visible in FIG. 6).

In use, the jig 12 is positioned through pin 12a and a screw member 12c between flanges 10a and 10b of the single electrical outlet box 10. On the other hand, with the double electrical outlet box 20, jig 12, which is somewhat longer than that used on the single electrical outlet box, is positioned through pin 12a and screw member 12c between flange 20a' and flange 20b or between flange 20a and flange 20b'. In either form of jig 12, a removable centering pin 12d is provided. In other words, with such an arrangement, the pin 12d is automatically positioned at the center of either size of outlet box.

After appropriate installation of an outlet box, wallboard 14 and then paneling 16 are disposed on the studs 30. A quick, non-accurate measurement locates a place which should be drilled to permit passage of the centering pin 12d through the paneling 16 (see FIG. 1).

The invention further includes a guide plate 17 having a centrally disposed opening 17a therethrough, as well as a knob 17b for ease in use. The aforesaid guide plate 17 fits within a frame 19a of a template 19, the frame 19a being secured to a base member 19b which has an opening 19c corresponding in shape to the piece which will be removed from the paneling 16, after routing action has been accomplished, to reveal the electrical box. The base member 19b has a multi-function, i.e. provides strength and, as well, serves to protect the finish of the paneling 16 during the routing operation.

In other words, the centering pin 12d extends through opening 19c in the template 19 and the opening 17a in the guide plate 17, meaning that the entire structure is centered about the centering pin 12d. Brads or like fastening means 22 are employed to position the template 19 onto the paneling 16, typically adjacent opening 19c and subsequently covered by the plate for the electrical box (represented by broken lines in FIG. 4).

Figure 3:
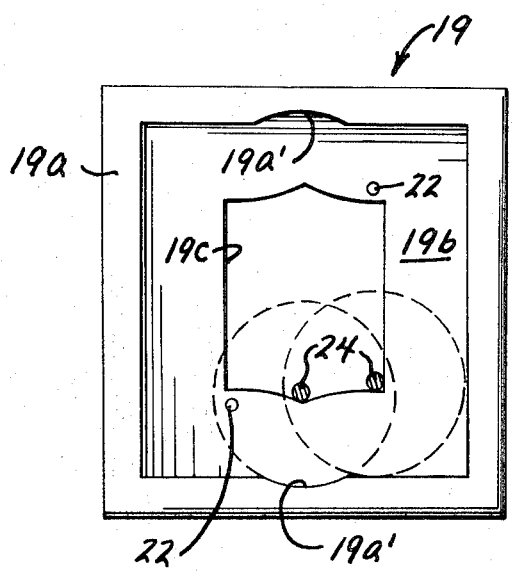
FIG. 3 is a view in front elevation of the template employed for a single electrical outlet box.
Figure 5:
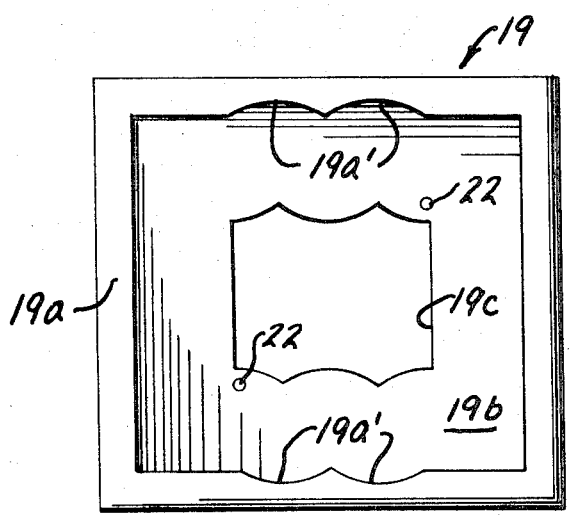
FIG. 5 is a view in front elevation of a template employed for a double electrical outlet box; and, FIG. 6 is a view of the jig used with a double electrical outlet box.

After centering, the guide plate 17 is removed, as is centering pin 12d, and a router 24 is employed (partially represented in FIG. 3 and 4), the latter following the inner configuration of the frame 19a of the template 19. Importantly, the geometry of the shape of the router base (shown by broken lines in FIG. 3) and cutout portions 19a' in the frame 19a of the template 19 achieve the specialized configuration of the opening 19c in the template 19. In other words, the radius of each cutout portion 19a' should be the same as the radius of the router in order to achieve the peaks on the bottom and the portions of the opening (see FIGS. 3 and 5), which peaks provide space for access to the upper and lower flanges on the respective electrical outlet boxes (see FIG. 4). The router 24 is so set that it merely cuts the thickness of the paneling 16, and, after cutting has been accomplished, the template 19 is removed from the wall.

From the preceding, it should be apparent that the invention provides a simplified and yet positive approach for cutting an opening in paneling, wallboard, or the like to provide access to an electrical or similar box. Obviously, other configurations of a jig may be employed, where, however, an important feature of the invention lies in the fact that centering is virtually an automatic procedure and finished results are identical from one operational site to another. Thus, the preceding description should be considered illustrative of the invention.

I claim:

1. Apparatus for locating a desired access opening to a unit concealed behind a covering member comprising a jig releasably secured to said unit and having centering means extending forwardly therefrom, a template having a frame portion with a specialized inner wall configuration, and a guide plate releasably positioned within said frame portion of said template, said guide plate having an opening therethrough adapted to receive said centering means on said jig and center said template with respect to said unit.

2. The apparatus of claim 1 where said jig is an elongated member having fastening means adapted to cooperate with openings on said unit.

3. The apparatus of claim 1 where said centering means is a pin.

4. The apparatus of claim 1 where said specialized inner wall configuration of said frame portion has at least one concave portion.

5. The apparatus of claim 4 where said pattern defined by said specialized inner wall configuration of same frame portion is outlined.

6. The apparatus of claim 5 where a part of said outline is equal to the radius of said at least one concave portion.

7. The apparatus of claim 1 where means releasably secure said template to said covering member.

8. The apparatus of claim 7 where said securing means are disposed within an area subsequently covered by a front plate for said unit.

* * * * *